(12) United States Patent
Kawabata

(10) Patent No.: US 6,236,979 B1
(45) Date of Patent: *May 22, 2001

(54) MARKETING SYSTEM, INFORMATION COMMUNICATIONS METHOD, AND RECORDING MEDIUM WITH DUAL COMMUNICATIONS MEANS FOR ACQUIRING AND TRANSMITTING INFORMATION

(75) Inventor: Hideki Kawabata, Tokyo (JP)

(73) Assignee: Prosper Creative Co., Ltd., Chuo-ku (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/986,197

(22) Filed: Dec. 5, 1997

(30) Foreign Application Priority Data

Dec. 6, 1996 (JP) ..................................... 8-327242

(51) Int. Cl.[7] ..................................... G06F 17/60
(52) U.S. Cl. ............................................... 705/27
(58) Field of Search ................... 705/26, 27, 78, 705/79, 64, 17

(56) References Cited

U.S. PATENT DOCUMENTS 5,319,542 * 6/1994 King, Jr. et al. .................... 705/27
5,727,163 * 3/1998 Bezos ................................... 705/27
5,832,459 * 11/1998 Cameron et al. ................... 705/26

FOREIGN PATENT DOCUMENTS

| 0 109 189 A1 | 5/1984 | (EP) . |
| 0 416 482 A2 | 3/1991 | (EP) . |
| 2 295 256 | 5/1996 | (GB) . |
| 07307813 | 11/1995 | (JP) . |
| WO 97/49055 | 12/1997 | (WO) . |

OTHER PUBLICATIONS

Abstract for Japanese Patent No. JP 9167220 A, Patented Jun. 24, 1997.

* cited by examiner

Primary Examiner—James P. Trammell
Assistant Examiner—Thomas A Dixon
(74) Attorney, Agent, or Firm—Sterne, Kessler Goldstein & Fox P.L.L.C.

(57) ABSTRACT

A marketing system capable of improving security of private information in mail order. Terminal equipment of a client retrieves product information from communications equipment of a provider. The terminal equipment of the client starts a program for an order when the client places an order on a display screen displaying the product information. Receiving order information input by the client, the terminal equipment of the client transmits the order information to terminal equipment of a vendor through a communications network other than WAN (wide area network). When the program is not installed in the terminal equipment of the client, it can be transmitted from the communications equipment of the provider to the terminal equipment.

22 Claims, 14 Drawing Sheets

*FIG.12*

MARKETING SYSTEM, INFORMATION COMMUNICATIONS METHOD, AND RECORDING MEDIUM WITH DUAL COMMUNICATIONS MEANS FOR ACQUIRING AND TRANSMITTING INFORMATION

BACKGROUND OF THE INVENTION

1. Field of the Invention

The present invention relates to a marketing system, an information communications system and a recording medium thereof, in which terminal equipment of a client refers to (retrieves) product information of a vendor through a wide area network (WAN) such as the Internet, or through radio communications facilities like satellite broadcasting, TV broadcasting, etc., and the client transmits order information including information about payment to the vendor through a communications system other than the WAN.

2. Description of Related Art

As one of such conventional systems, a system is known, in which terminal equipment of a client retrieves product information from an information server connected to the Internet, and displays the product information. The software for displaying the product information consisting of a combination of images and characters is called a browser on the World Wide Web, and Netscape produced by Netscape Communications Corporation is known as one of them, for example. The client decides products to buy watching the product information displayed on the terminal equipment. Then, the client orders the products from the vendor. The order is placed by phone, facsimile or WWW browser.

The order by phone is carried out through talking between the client and a clerk, in which case, the clerk must manually operate a computer to enter and register order information such as product names, client's name and address, and a method of payment. Thus, this method cannot respond to orders of a large number of clients.

In view of this, a marketing system is proposed in which terminal equipment of a vendor or a communication system of a commercial provider is used as information server and order accepting equipment at the same time, and terminal equipment of a client receives product information therefrom, and transmits order information thereto as needed. In this case, however, since the order information includes the identification (ID) number of a credit card when the client wishes to complete payment by the credit card, such important information is transmitted through the Internet. Thus, the ID number of the credit card is exposed to risks of theft and abuse. As a result, this method has a problem with security.

One of the most popular information communications method in the case where the product information is provided through the Internet is to send the order information from a client to a vendor individually by facsimile. Since this obviates talking between the client and the clerk, it can respond to a large number of orders. The problem still remains, however, of inputting the order information into the computer by manual operation.

SUMMARY OF THE INVENTION

Therefore, a first object of the present invention to provide a marketing system that can display product information on terminal equipment of a client using a browser, and transmit order information from the terminal equipment of the client to terminal equipment of a vendor or a paying agent like a credit company through a communications system other than the WAN.

A second object of the present invention is to provide an information communications method with improved security in the marketing system.

A third object of the present invention is to provide a recording medium that enables terminal equipment to install the software recorded thereon, and to add a function to place an order.

To accomplish the foregoing objects, the present invention provides a marketing system comprising: an information server for providing a WAN (wide area network) with guidance information including product information about selling a product and instructions information about an order; terminal equipment connectable to the WAN; and order accepting equipment, wherein the terminal equipment including: first communications means for acquiring the guidance information from the information server through the WAN; display means for displaying the product information and particular information for an order in the guidance information acquired; a pointing device for pointing the particular information on an image on the display means; input means for inputting order information about an order; control means for enabling input of the order information through the input means in response to a pointing of the pointing device; and second communications means for transmitting the order information input through the input means to the order accepting equipment through a communications network other than the WAN.

Here, the order information may include an identification number of a credit card. This will not impair protection of personal information about the client because the order information is transmitted through the communications network other than the WAN.

The order accepting equipment may be installed in a shop of a vendor, or may be installed in an order accepting center to receive order information about products from a plurality of vendors. This will make it possible to provide a marketing system which meets various needs of clients.

The terminal equipment may automatically carry out the input control of the order information, and the switching of communications from that between the information server and the terminal equipment to that between the order accepting equipment and the terminal equipment, or vice versa, by reading and executing a program. This will improve the security of the order information because the order accepting equipment cannot be accessed by terminal equipment without the program. In addition, enabling the program to be transmitted from the information server to the terminal equipment can save trouble of the client. This will induce the client to buy through the marketing system.

The marketing system may make a decision whether the software is present in the terminal equipment, command transfer of the software when the decision is a negative one, and acquire the software from the information server in response to the transfer of the command. This will free the client from checking whether the program is installed in the terminal equipment each time he or she places an order.

The terminal equipment may disconnect the connection with the information server when carrying out communications with the order accepting equipment. This can prevent the order information from being erroneously transmitted to the WAN.

The terminal equipment may cumulatively store order information transmitted to the order accepting equipment, and display the order information stored. This will enable the client to learn the history of the orders up to now.

The terminal equipment may select particular order information from among the order information displayed on a display, command cancellation of an order, generate, in response to the cancellation command, cancellation information for canceling the order including the particular order information selected, and transmit the cancellation information to the information server. This will save trouble of the client for generating the cancellation information at the terminal equipment.

The above and other objects, effects, features and advantages of the present invention will become more apparent from the following description of the embodiments thereof taken in conjunction with the accompanying drawings.

BRIEF DESCRIPTION OF THE DRAWINGS

FIG. 12 is a diagram illustrating an example of an image for inputting personal information;

DETAILED DESCRIPTION OF PREFERRED EMBODIMENTS

The invention will now be described with reference to the accompanying drawings.

EMBODIMENT 1

Figure 1:
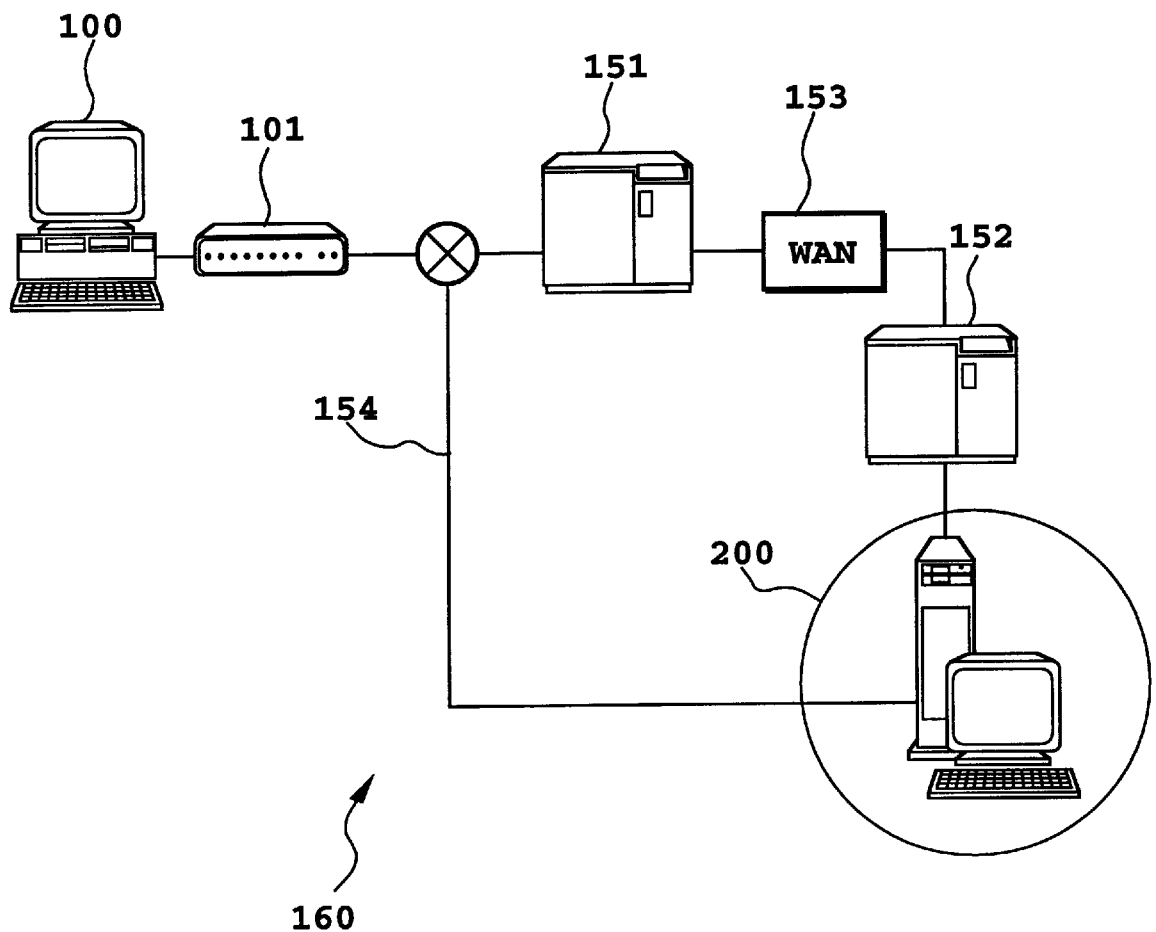
FIG. 1 is a block diagram of a first embodiment of the marketing system in accordance with the present invention.

FIG. 1 is a diagram showing an embodiment 1 of a marketing system in accordance with the present invention.

In FIG. 1, terminal equipment 100 of a client is connected to a public phone network 160 through a modem 101. The terminal equipment 100 is connected with terminal equipment 200 through two types of communications systems. A first communications system is a WAN (Wide Area Network) like the Internet. The terminal equipment 100 is connected to a public phone channel of a WAN 153 through communications equipment 151 of a provider; and communications equipment 152 of the provider provides the terminal equipment 100 with product information in response to its request. Here, the communications equipment 152 is an information server in accordance with the present invention, which is also called a server.

The communications equipment 152 of the provider stores in its storage product information, and the terminal equipment 100 of the client receives the product information of the terminal equipment 200 which is accessed by the client. The terminal equipment 200 of a vendor sends product information about new products or that to be updated to the communications equipment 152 of the provider to be stored in its storage.

A second communications system is a public phone network 154 for communication using preassigned phone numbers, and connects the terminal equipment 100 directly to the terminal equipment 200 in response to a call from the terminal equipment 100. Here, the public phone network 154 corresponds to a communications network other than the WAN of the present invention. The terminal equipment 100 sends order information to the terminal equipment 200 through the public phone network 154. In the present embodiment, the reference numeral 160 designates public phone networks in their entirety, the reference numeral 153 designates the communications system (WAN) connecting the terminal equipment 100 with the communications equipment 152, and the reference numeral 154 designates the communications system (public phone network) directly connecting the terminal equipment 100 with the terminal equipment 200.

The present invention is characterized in that it has a pair of communications systems, and that the terminal equipment 100 carries out switching between the two communications systems automatically in response to an product order of the client.

Figure 2:
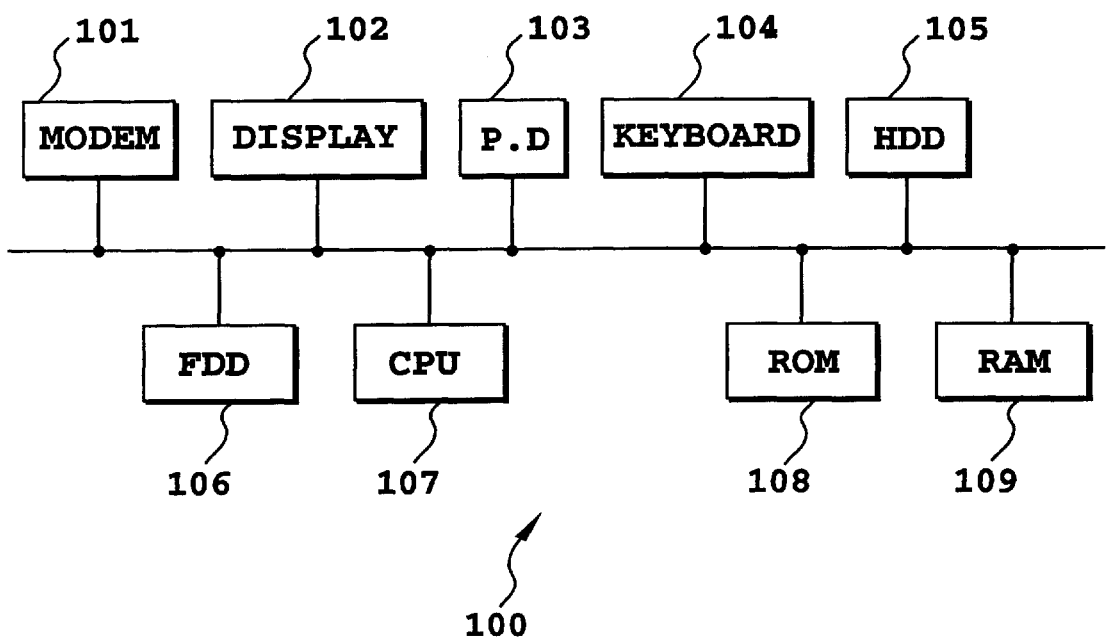
FIG. 2 is a block diagram showing an internal configuration of terminal equipment 100 of FIG. 1.

FIG. 2 shows an internal configuration of the terminal equipment 100 to implement such a function. A general purpose personal computer, work station, or game machine with a CPU, which have a communication function each, can be used as the terminal equipment 100. In FIG. 2, a CPU 107 is connected with a modem 101, a display 102, a pointing device 103, a keyboard 104, a hard disk drive (HDD) 105, a floppy disk drive (FDD) 106, a ROM 108 and a RAM 109. Although interfaces are interposed between the CPU 107 and the peripheral devices such as the modem 101 and keyboard 104, they are well known and hence omitted from FIG. 2 for convenience's sake.

Figure 4:
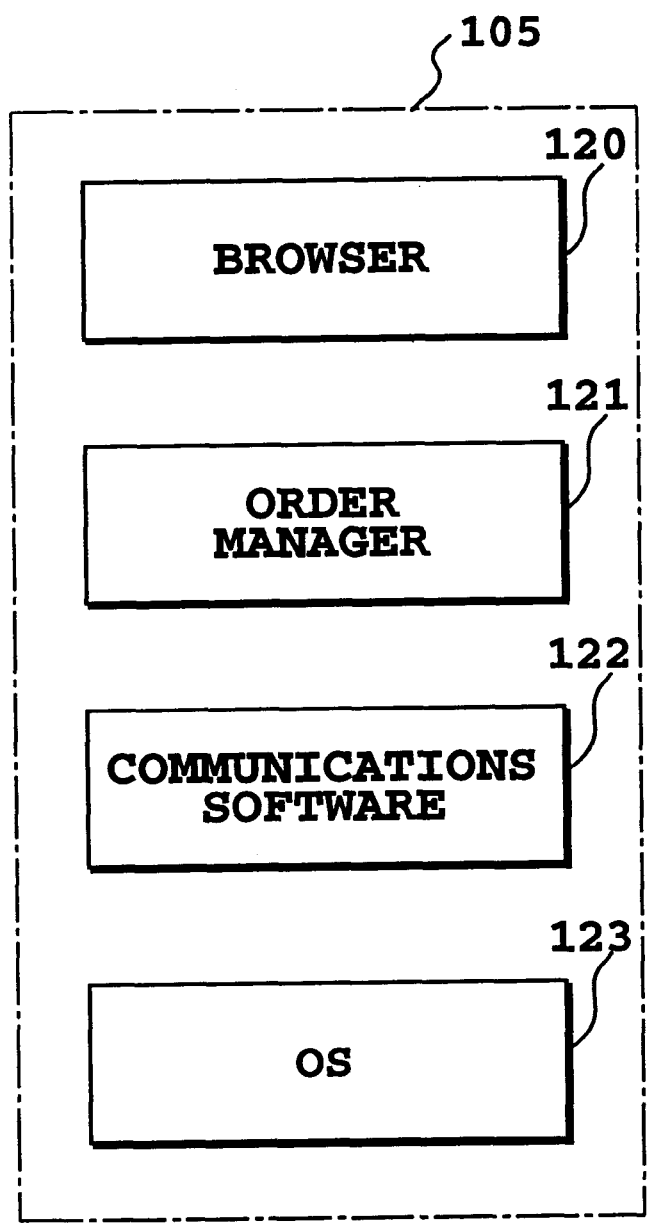
FIG. 4 is a block diagram showing the contents of software used by the terminal equipment 100.

The modem 101 is used when the public phone network 160 is analog. If the public phone network 160 is digital, a dedicated terminal adapter is used. The display 102 displays the product information sent from the communications equipment 152 of the provider. The product information consists of characters and graphics, and the document describing the product information is generally called a home page in this specification. Pointing a button or a particular phrase on the home page with the pointing device 103 enables the pages associated with them to be displayed on the display 102. In addition, pointing to a particular phrase or a button on the linked page makes it possible to proceed to a new page or to return to the initial home page. Such processing is implemented by a browser 120 as shown in FIG. 4. The link instructions (instructions to switch pages) from the client are transferred to the communications equipment 152 of the provider, and the terminal equipment 100 receives and displays the page information fed by the communications equipment 152.

The pointing device 103 is used for inputting the link instructions and interactive information. The keyboard 104 is used for inputting characters and commands.

The HDD 105 stores a plurality of programs as shown in FIG. 4. Here, we will describe software for displaying the product information and transmitting the order information, which are associated with center manager software and order manager software described later in detail. The browser 120 is a program for accepting instructions of a client, requests the communications equipment 152 of the provider to send the home page to be displayed through communications software 122, and receives it.

Although some of the conventional software can be used as the browser 120, the present embodiment differs from the conventional system in that the order manager 121 is started when the client points with the pointing device 103 an order button on the page displayed on the display 102.

The order manager 121, which is one of the features of the present invention, can directly access the terminal equipment 200 in conjunction with the communications software 122 to communicate with it through the public phone network 154. In addition to transmitting the order information to the terminal equipment 200, the order manager 121, when started alone, accepts information about the cancellation of an order and transmits it to the communications equipment 152 of the provider.

The communications software 122 includes a plurality of communications programs. It includes at least communications programs such as TCP/IP (Transmission Control Protocol/Internet Protocol) and a so-called PC (Personal Computer) communications program for controlling communications on the public phone network 154. Conventional communications programs can be applied to the communications software 122 as long as they match the protocol of the WAN 153 and the terminal equipment 200.

An operating system (OS) 123 is software for controlling the entire terminal equipment, such as System 7.5 released by Apple, Windows 95 released by Microsoft Corporation, and OS/2 by IBM. The operating system 123 controls input, display and storage of the information. The foregoing programs are stored in the HDD 105 in the form of a program language readable by the CPU 107. In addition, the HDD 105 cumulatively stores the order information transmitted from the terminal equipment 100 to the terminal equipment 200.

The FDD 106 reads and writes information on a floppy disk. The order manager 121 can be loaded on the HDD 105 by setting in the FDD 106 a floppy disk recording it.

The CPU 107 carries out system control, communications control, and processing for guiding product information and order processing related to the present invention by executing corresponding programs. The CPU 107 loads the programs from the HDD 105 to the RAM 109 before executing them.

The ROM 108 stores information for controlling the system such as a boot program started on powerup, fonts, and the like.

The RAM 109 temporarily stores input and output information of the CPU 107. The RAM 109 also temporarily stores information inputted through the keyboard 104 and pointing device 103, as well as image information to be displayed on the display 102.

Besides the foregoing configuration, peripheral devices like a magneto-optical disk drive can be connected to the terminal equipment 100 as necessary.

Figure 3:
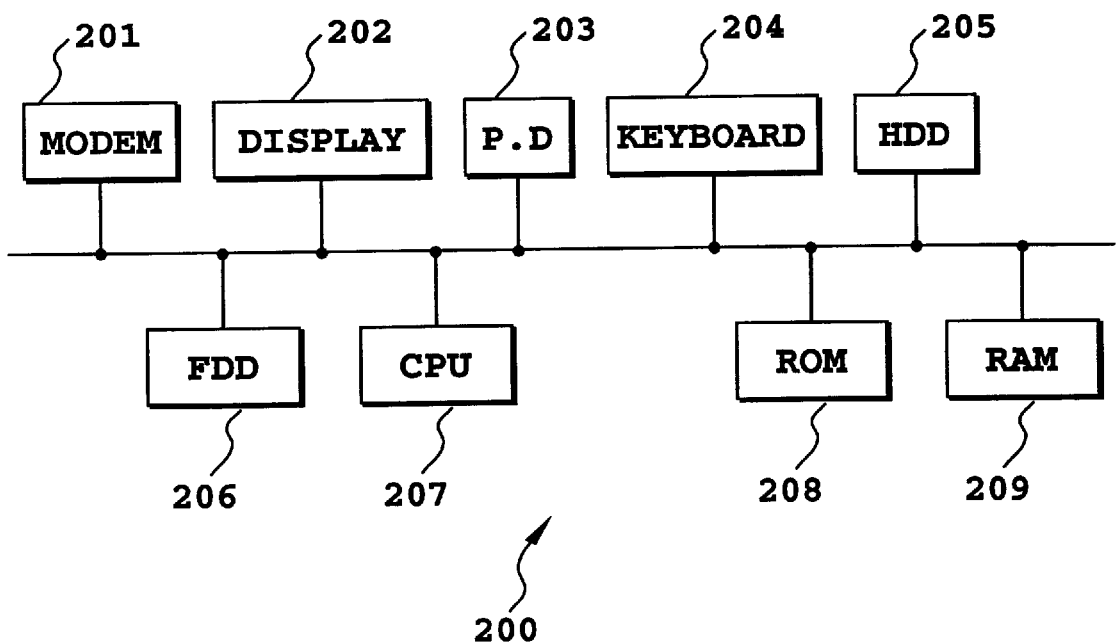
FIG. 3 is a block diagram showing an internal configuration of terminal equipment 200 of FIG. 1.

FIG. 3 shows an internal configuration of the terminal equipment 200. The terminal equipment 200 can also use a versatile personal computer or work station as the terminal equipment 100. In FIG. 3, a CPU 207 is connected with a modem 201, a display 202, a pointing device 203, a keyboard 204, a hard disk drive (HDD) 205, a floppy disk drive (FDD) 206, a ROM 208 and a RAM 209. Although interfaces are interposed between the CPU 207 and the peripheral devices such as the modem 201 and keyboard 204, they are well known and hence omitted from FIG. 3 for convenience's sake.

The modem 201 connects the terminal equipment 200 to the terminal equipment 100 through the public phone network 154 on the public phone network 160. Usually, it waits for an order from the terminal equipment 100 of the client. When an operator of the vendor updates product information stored in the communications equipment 152 of the provider, or enters new information thereto, the modem 201 connects the terminal equipment 200 to the communications equipment 152 through the WAN 153 of the provider.

The display 202 displays information such as input information from the keyboard 204 or order information stored in the HDD 205. The pointing device 203 inputs various information like commands to the CPU 207 by pointing a particular position on the screen of the display 202. The keyboard 204 is used for inputting information to the CPU 207.

Figure 5:
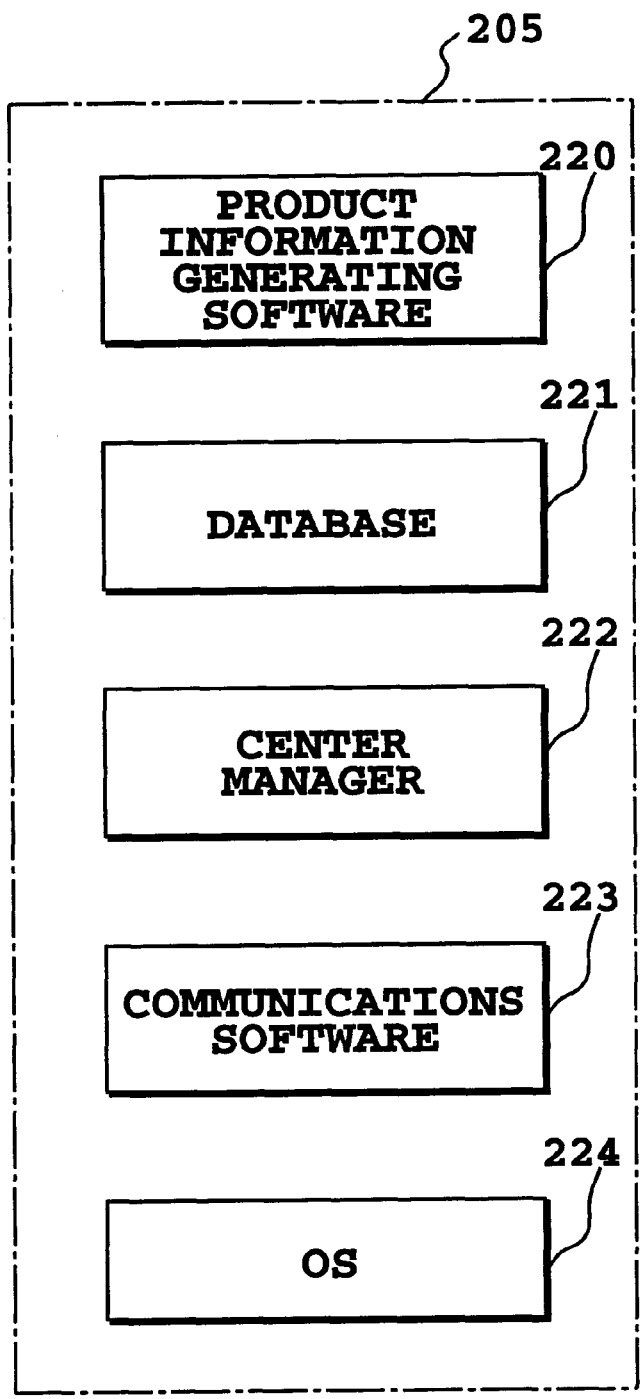
FIG. 5 is a block diagram showing the contents of software used by the terminal equipment 200.

The HDD 205 stores a plurality of programs and a database as shown in FIG. 5. More specifically, it stores a database 221 for storing received order information, a program 222 for accepting cancellation, a program 223 for controlling communications, a program 220 for generating product information to be stored in the communications equipment 152 of the provider, and an operating system 224 for carrying out the overall control of the system.

The FDD 206 reads and writes information on a floppy disk. The FDD 206 reads the product information generating software 220 and the program 222 (called center manager from now on) for accepting orders from a floppy disk that records them under the control of the CPU 207, thereby storing them in the HDD 205.

The center manager 222 accepts order information from user terminal (order manager) 100, and manages ordered products. The product management in the present embodiment includes information management such as shipping information of user products, information about product handling, information about customer complaints, additional product information, and update information of the products. This enables user support personnel of the vendor to be reduced, thereby making it possible to reduce the payload, and to provide inventory and sales management application functions. The center manager 222 also functions as a filter for selecting from the database only necessary information to be transmitted outside when a credit company or a POS system is connected.

The CPU 207 carries out system control in accordance with the operating system 224. In addition, it executes various information processings in accordance with the software stored in the HDD 205 and ROM 208. The information processing associated with the present invention will be described in detail later.

The ROM 208 stores information for controlling the system such as a boot program, fonts, and the like. The RAM 209 temporarily stores input and output information of the CPU 207, software to be executed by the CPU 207, and image information to be displayed on the display 202.

It will not be necessary to describe the internal configurations of the communications equipment 151 and communications equipment 152 of the provider because existing apparatuses are applied to them.

The information processing involved in marketing products by the system with the configuration as shown in FIG. 1 will now be described. It is assumed here that the Internet is used as the WAN 153, and that the communications equipment 152 of the provider for storing the product information (home pages) is called a WWW (World Wide Web) site. The product information is provided in the form of documents including characters and graphics, and the home pages consist of these documents. The home pages are described using a language such as HTML (HyperText Markup Language). The browser 120 in the terminal equipment 100 of the client edits the documents into a predetermined format and displays them. For access requirement from the terminal equipment 100 of the client to the home pages, port number on the Internet including which is called the communication address URLs (Uniform Resource Locators) specifying on the Internet.

Figure 6:
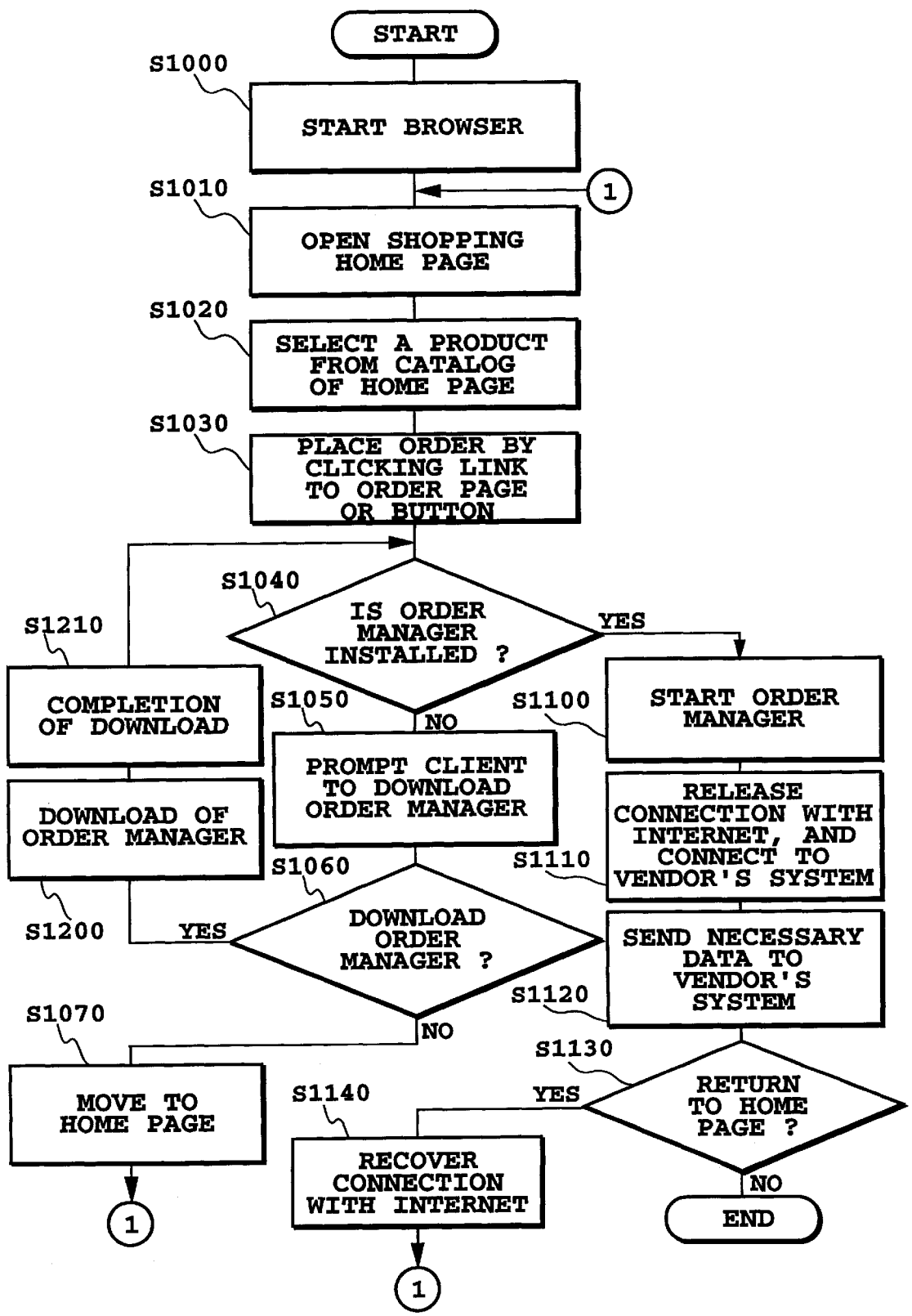
FIG. 6 is a flowchart illustrating a processing of a browser 120 of FIG. 4.

The client, operating the pointing device 103 of the terminal equipment 100, starts up the browser 120 for the WWW. FIG. 6 shows the procedure associated with the browser 120. In response to the start of the browser 120, the CPU 107 starts the procedure as shown in FIG. 6. First, at step S1000, the CPU 107 accesses the communications equipment 151 of the provider using the communications software 122, and connects the terminal equipment 100 to the Internet 153 after the log in.

Then, the client inputs the URL for a home page of a desired vendor through the keyboard 104, thereby instructing to display the home page. Specifically, the CPU 107 accesses the communications equipment 152 of the provider in accordance with the input URL to retrieve the home page information, that is, text information, image information, prices, and format information used for displaying.

The CPU 107 converts the retrieved home page information into a document to be displayed in accordance with the format information, temporarily stores it in the RAM 109, and displays the home page on the display 102 at step S1010. An example of the display is denoted by the reference numeral 300 in FIG. 11.

So far is the processing which is also carried out conventionally. Incidentally, the reference numeral 301 in FIG. 11 designates a button for switching the present display image to the previous display image, and 302 designates a button for switching the present display image to the next display image. The reference numeral 303 designates a button for switching the present image back to the home page image.

The reference numerals 304 and 306 each designate a product in a catalog represented by an image such as a picture or an illustration of the product plus a message explaining it as needed. The reference numerals 305 and 307 each designates a button to select and order the product 304 and 306. The buttons 301–303, 305 and 307 are operated by pointing them with the pointing device 103 at step S1020.

Thus, the client issues an order of a desired product by designating the button associated with the product at step S1030.

Then, the CPU 107 extracts the product information corresponding to the pointed button from among the information which is received from the WWW site and stored in the RAM 109, stores it in another area of the RAM 109, and starts the order manager 121 at step S1100 after confirming whether the order manager 121 has been installed in the HDD 105 at step S1040.

If the order manager 121 has not yet been installed, a message and a button for prompting to download it, that is, to retrieve it from the WWW site, are displayed at predetermined positions on the image 300 at step S1050. Detecting the operation of the button, the CPU 107 sends instructions to the WWW site to download the order manager 121. Receiving the instructions, the WWW site (the communications equipment 152 of the provider) transmits the order manager 121 stored in its internal memory to the terminal equipment 100.

The terminal equipment 100 stores the received order manager 121 in the HDD 105 through steps S1060, S1200 and S1210, and the processing is returned to step S1040.

When the order manager 121 has already been installed in the HDD 105, the CPU 107 proceeds its processing from step S1040 to step S1100, and starts the order manager 121.

Figure 11:
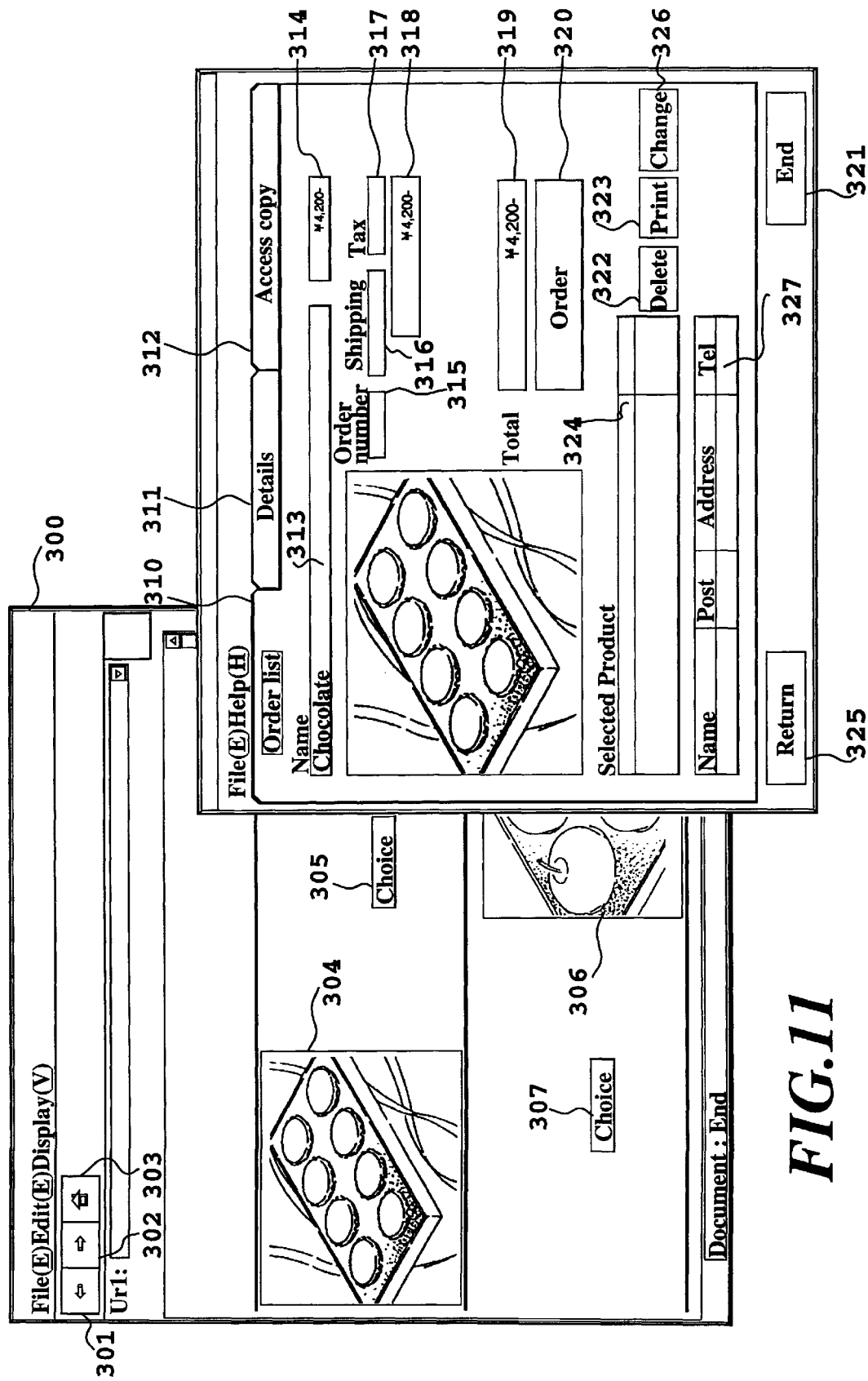
FIG. 11 is a diagram illustrating an example of an product information guidance image and an order image in the first embodiment.

The order manager 121 has the display 102 display an order list image 310 as illustrated in FIG. 11. The client confirms the selected product by the image 310. We will describe the order list image here. The reference numeral 313 designate a section for displaying the product name the client has selected on the home page. The reference numeral 314 designates a section for displaying the price of the selected product, which is retrieved from among the information sent from the communications equipment 152 of the provider and stored in the PAM 109 of the terminal equipment 100 together with the home page information.

The reference numeral 315 designates an order number display section to which the client inputs the number through the keyboard 104. The reference numeral 316 designates a transportation charge display section, and 317 designates a consumption tax display section, the display information of which are selected from among the product information transmitted from the communications equipment 152 of the provider. The reference numeral 318 designates a subtotal display section of each product, which is computed by the CPU 107 from the information about the order number, price, and taxes such as the consumption tax. The reference numeral 319 designates a cumulative sum display section of the entire order, which is computed by the CPU 107.

Figure 12:
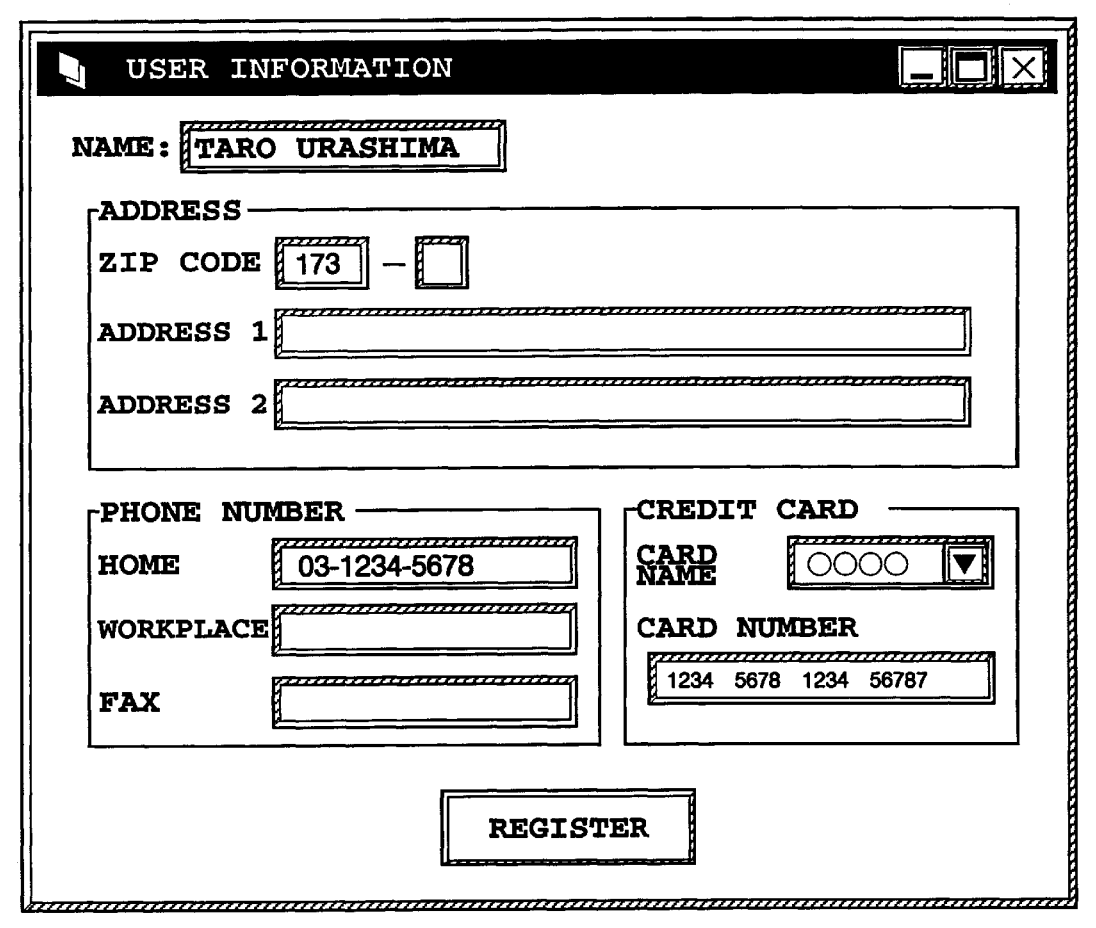

The reference numeral 320 designates an order button, the operation of which causes the display 102 to display a personal information input image about the client as illustrated in FIG. 12. The reference numeral 321 designates a button for ending the processing by the order manager 121, and 322 designates a button for instructing cancellation of the ordered product displayed in the order list display section 324.

The reference numeral 323 designates a button for instructing to print the information the client has input, and 324 designates a section for enumerating, in a list fashion, names of one or more products the client has selected. The reference numeral 325 designates a button for instructing to return the present display image to the home page display, 326 designates a button for changing the destination, and 327 designates a destination entry section.

In the present embodiment, selection of a plurality of products is possible. Since the terminal equipment 100 is still being connected with the communications equipment 152 of the provider before the client operates the order button 320, it retrieves the home page again from the communications equipment 152 of the provider when the client operates the button 325 so that the image 300 is displayed again. When the client selects another product, the order manager 121 displays the order list image 310 associated with that product. At this stage, two product names are displayed in the product list display section 324. When the client wishes to delete a once selected product from the product list display section 324, he or she points that product name in the product list display section 324 with the pointing device 103, and then operates the cancellation button 322. Receiving the operation, the CPU 107 executes the order manager 121 to delete the selected product name from the product list information on the RAM 109.

Completing the selection of the order, the client operates the order button 320 with the pointing device 103. In response to this, an image for inputting the personal information (user information), by the order manager 121 is displayed on the display 102 as shown in FIG. 12.

The client inputs through the keyboard 104 the personal information about his or her name, address, name of a credit card, its identification number, and payment. With the operation of a register button, the order manager 121 releases, by controlling the communications software 122, the present connection with the WAN 153 on the public phone network 160, and connects the terminal equipment 100 to the terminal equipment 200 of the vendor through the public phone network 154 on the public phone network 160, at steps S1100 and S1110. Subsequently, the order manager 121 reads from the RAM 109 the order information including the product names and numbers and the personal information, and transmits it to the terminal equipment 200 of the vendor at step S1120. The order information is also stored in the HDD 105 in the form of a database which separately stores the detailed information about the products, and the information needed for confirming payment. The stored information is read from the HDD 105 to be displayed on the display 102 when the client selects with the pointing device 103 a detailed information display tab 311 or an access copy display tab 312 as shown in FIG. 11.

Afterward, if the client wishes to return to the home page again, he or she operates the button 325 on the order list image as shown in FIG. 11. In response to this, the order manager 121 releases the connection between the terminal equipment 100 of the client and the terminal equipment 200 of the vendor, and connects the terminal equipment 100 again with the communications equipment 152 of the provider to retrieve the home page information at steps 1130 and 1140, then returning to step S1010. Thus, the browser 120 retrieves the home page and has the display 102 display it. In this way, the client can order additional products, or access to a home page of another vendor by inputting its URL.

When the client operates the end button 321 on the order list image 310 as shown in FIG. 11, the CPU 107 makes a decision that the order is completed, and closes the currently operating software including the order manager 121 and communications software 122, thereby terminating the processing (from step S1130 to END).

As described above, the client cannot input the order information unless the order manager 121 is placed in operation. In other words, the order manager 121 enables the client to input of the order information. In the present embodiment, the client starts the order manager 121 with the select button for the order in the home page retrieved from the communications equipment 152 of the provider. Subsequently, confirming the selected products on the image associated with the order manager, the client inputs the personal information including the identification number of the credit card by operating the order button 320. It should be noted that in response to the inputting of the personal information, the connection between the terminal equipment 100 of the client and the communications equipment 152 of the provider is released, and the connection between the terminal equipment 100 and the terminal equipment 200 of the vendor is established.

On the other hand, the terminal equipment 200 of the vendor, which is connected with the terminal equipment 100 through the public phone network 154, executes the center manager (program for accepting orders) 222 to accept the order from the terminal equipment 100 of the client.

Figure 8:
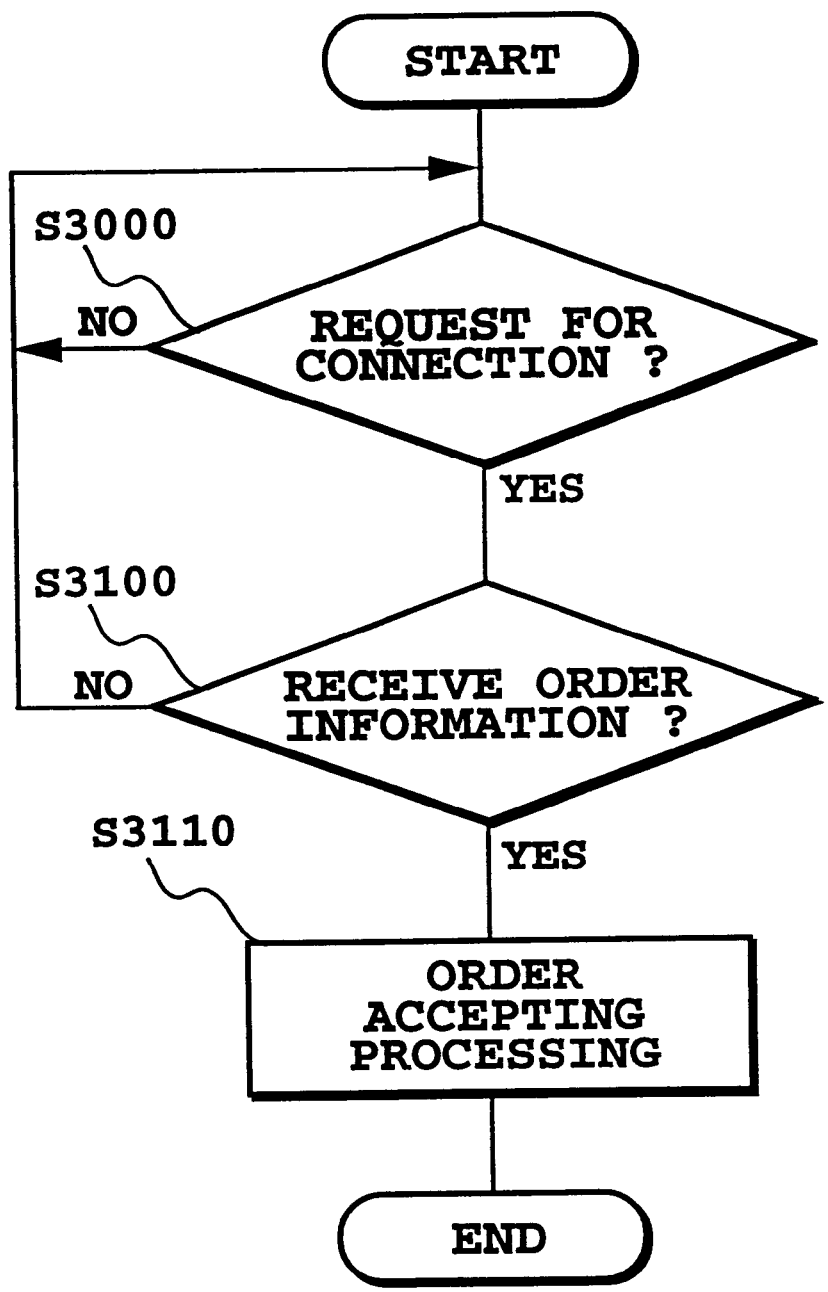
FIG. 8 is a flowchart illustrating a processing of an order accepting program 222 of FIG. 5

Receiving a connection request, that is, a log in request from the terminal equipment 100 of the client, the terminal equipment 200 of the vendor acknowledges the request, and receives the transmitted information as shown in FIG. 8. Thus, the CPU 207 stores the received information in the RAM 209 as shown in FIG. 3.

Figure 9:
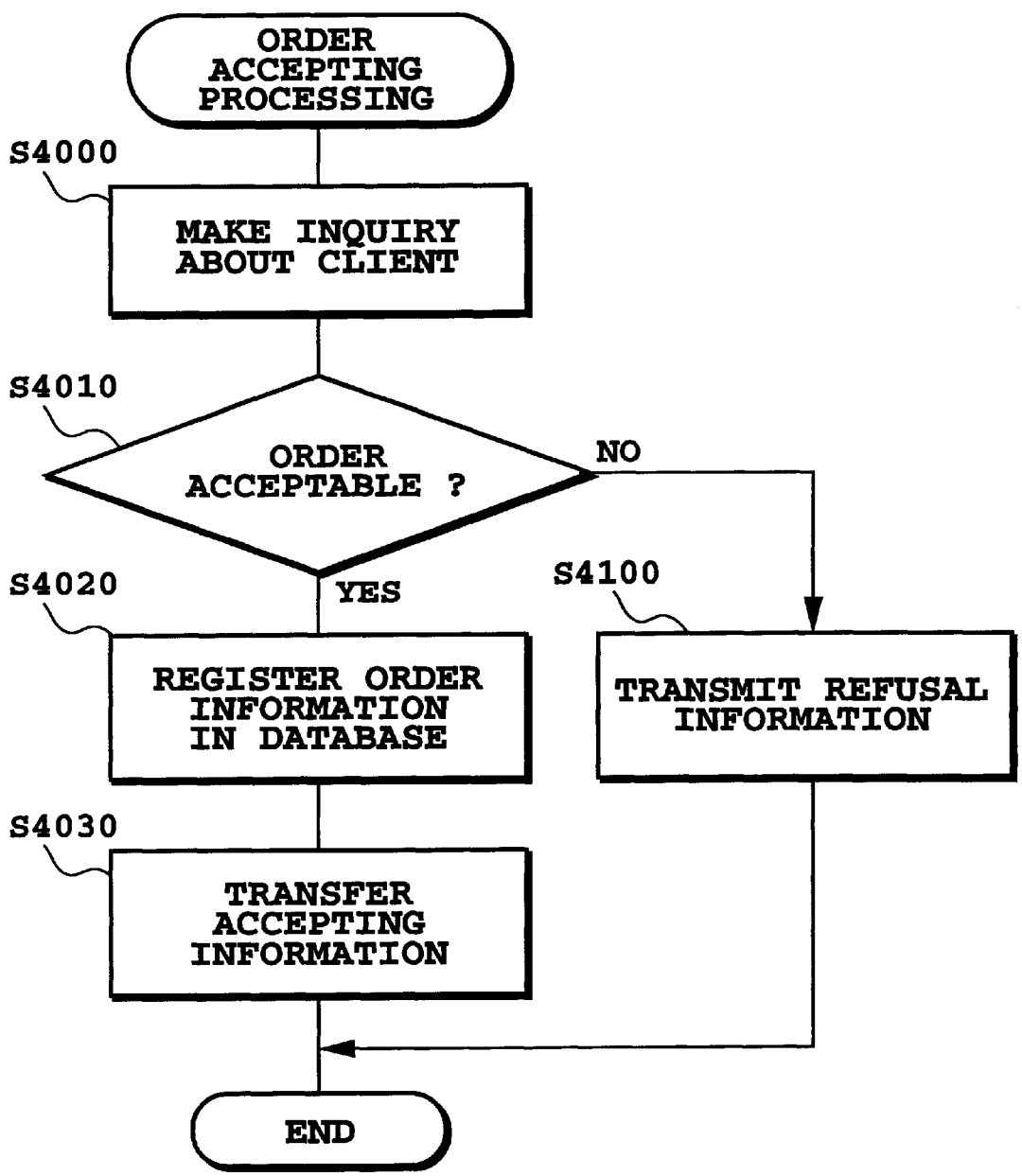
FIG. 9 is a flowchart illustrating a detailed procedure of an order acceptance.

Identifying from step S3000 to step S3100 that the received information is order information by the identification information in the received information, the CPU 207 proceeds to the order accepting processing as shown in FIG. 9, and executes it at step S3110.

The order accepting processing will now be described with reference to FIG. 9. The order information includes information associated with the products and the client. Thus, the CPU 207 makes a decision first at step S4000 whether or not the client's name and credit card identification number are acceptable by referring to those stored in the HDD 205 in advance. If a decision is made that the order is acceptable at step S4010, the CPU 207 registers the order information in the database 221 as shown in FIG. 5 at step S4020. Such a check of the client can be omitted.

Information such as the acknowledgment, date and number of the order is transmitted to the terminal equipment 100 of the client via the Internet (WAN). The terminal equipment 100 receives and displays the information, and stores the information needed for cancellation of or inquiry about the order at step S4030.

If a decision is made at step S4010 that the order is unacceptable, the CPU 207 transmits a message saying that to the terminal equipment 100 of the client at step S4100, and thereby terminating the processing of FIG. 9.

The foregoing is the processings of the terminal equipment 100 and terminal equipment 200 associated with buying.

The present embodiment can also perform the cancellation of the order.

Figure 7:
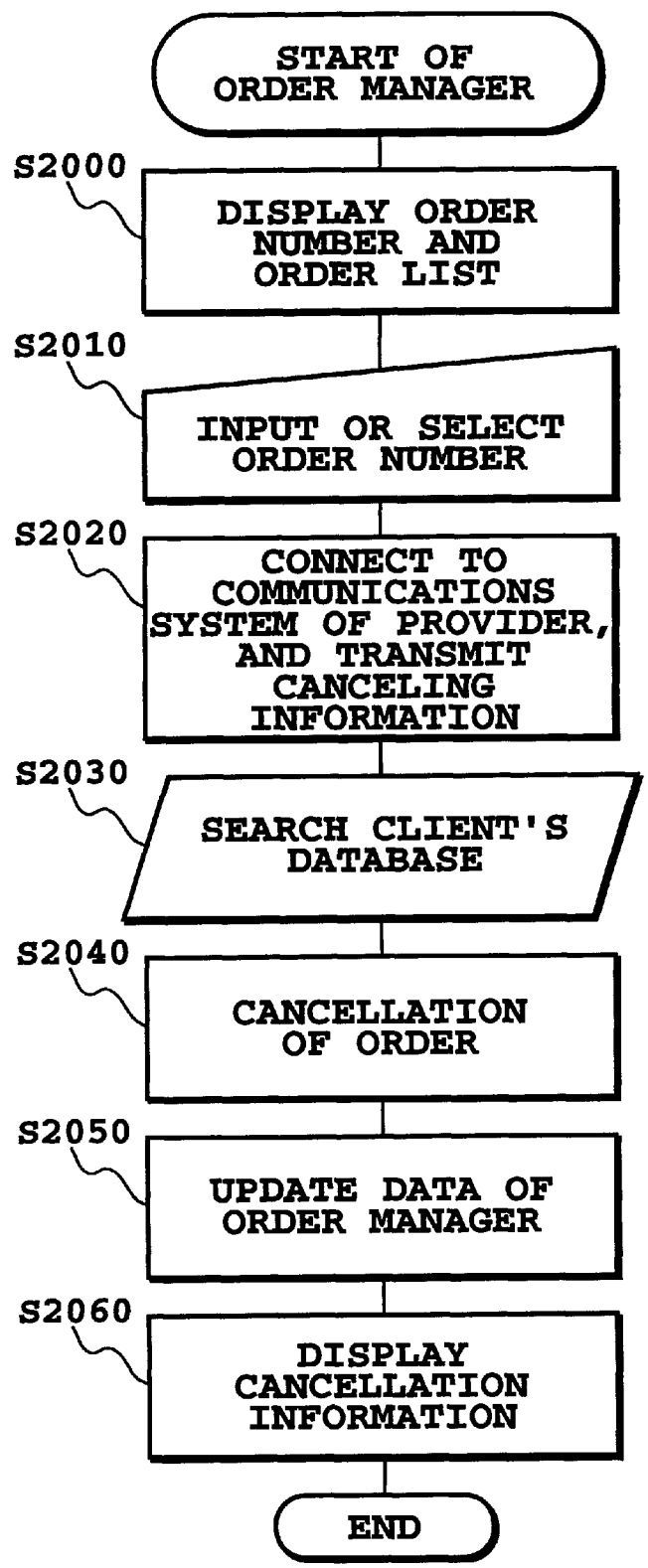
FIG. 7 is a flowchart illustrating a processing for canceling an order by an order manager 121 of FIG. 4.

To cancel the order, the client starts the order manager 121 by manipulating the pointing device 103. In response to this, the procedure as shown in FIG. 7 is started.

The order manager 121 reads from the HDD 105 the order list including the order number and product names, and displays it on the display 102 at step S2000.

The client selects with the pointing device 103 an item to be canceled in the order list displayed on the display screen at step S2010. The CPU 107 retrieves from the HDD 105 the information needed for the cancellation such as the name and address of the client using the selected order number and product name as a key. Receiving from the client the cancellation confirmation through the cancellation button, the CPU 107 generates transmitted cancellation information from the information instructing the cancellation and the retrieved information, and transmits it to the communications equipment 152 of the provider at step S2020. To achieve this, the order manager 121, controlling the communications software 122, establishes the connection between the terminal equipment 100 and the communications equipment 152 through the WAN 153.

Figure 10:
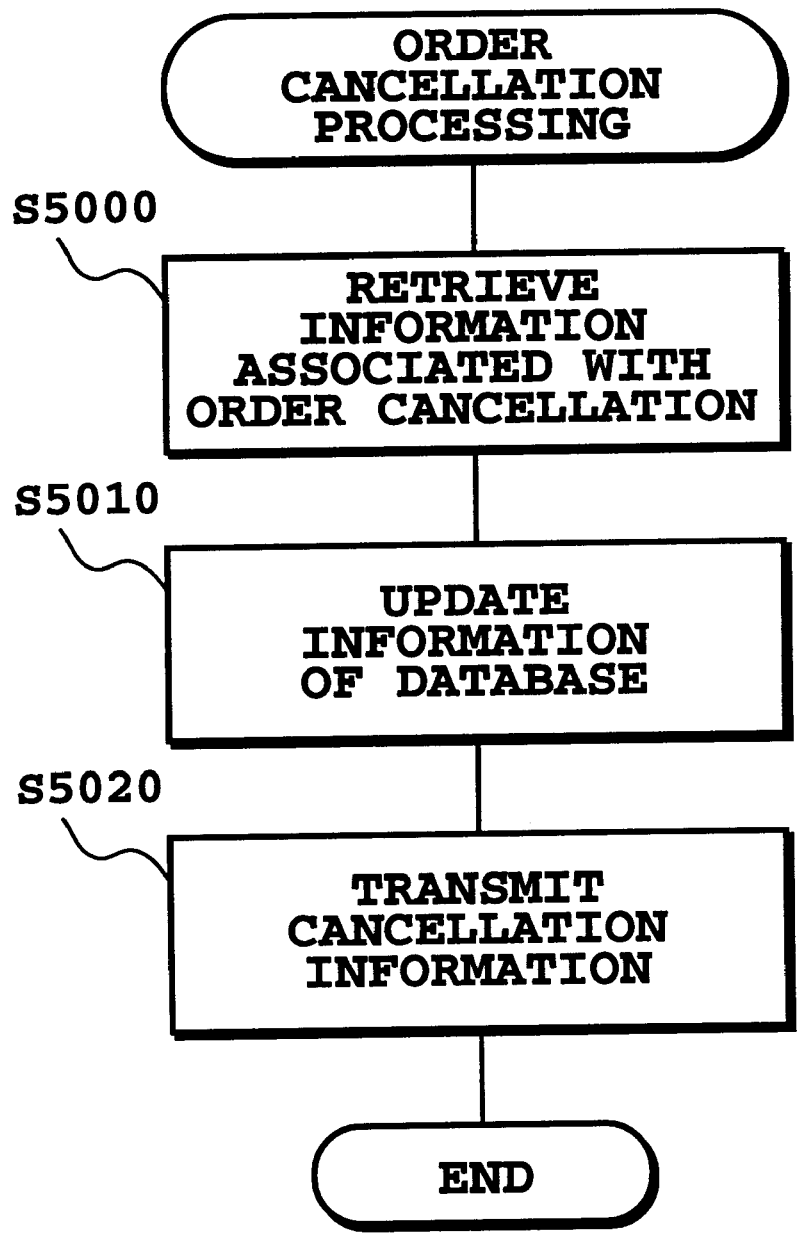
FIG. 10 is a flowchart illustrating a detailed procedure of an order cancellation.
Figure 13:
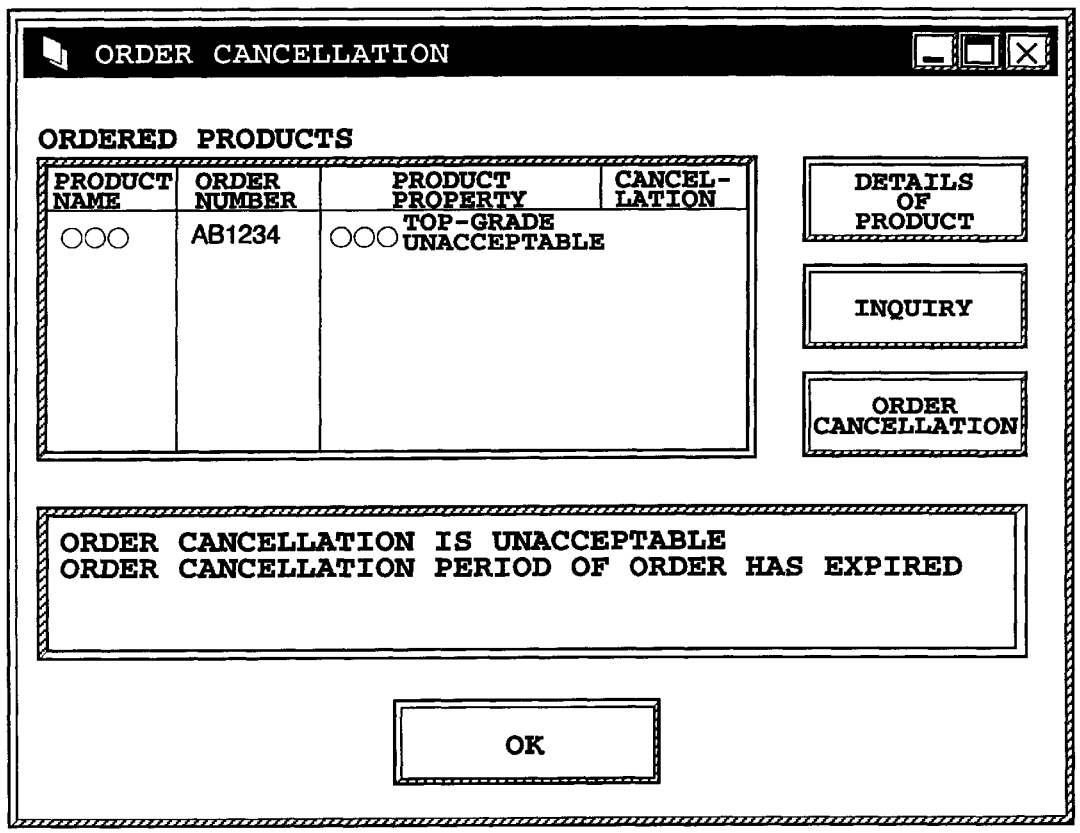
FIG. 13 is a diagram illustrating an example of an image for inputting cancellation information of an order.

The terminal equipment 200 of the vendor accesses the communications equipment 152 of the provider, and retrieves the cancellation information, if there is any, and stores it in the HDD 205. Alternatively, the cancellation information may be transmitted from the communications equipment 152 of the provider to the terminal equipment 200 of the vendor. Subsequently, the CPU 207 executes, in accordance with the procedure as shown in FIG. 10, a cancellation processing by retrieving order information stored in the HDD 205 at step S5000, and by deleting or revising the order information using the cancellation information at step S5010. Then, it transmits a reply message to the terminal equipment 100 of the client at step S5020. Receiving the reply message, the CPU 107 in the terminal equipment 100 of the client retrieves the order information in the database stored in the HDD 105 at step S2030 of FIG. 7, executes the cancellation processing at step S2040, and updates the data of the order manager at step S2050. Subsequently, it displays a message indicative of the completion of the cancellation on the display 102 at step S2060, thereby closing the procedure as shown in FIG. 7. If the terminal equipment 200 of the vendor makes a decision that the cancellation cannot be accepted, it sends a message saying that as shown in FIG. 13, and the terminal equipment 100 displays it.

As described above, the present embodiment cancels the order through the WAN 153, which reduces the charge for communications on the client.

EMBODIMENT 2

Figure 14:
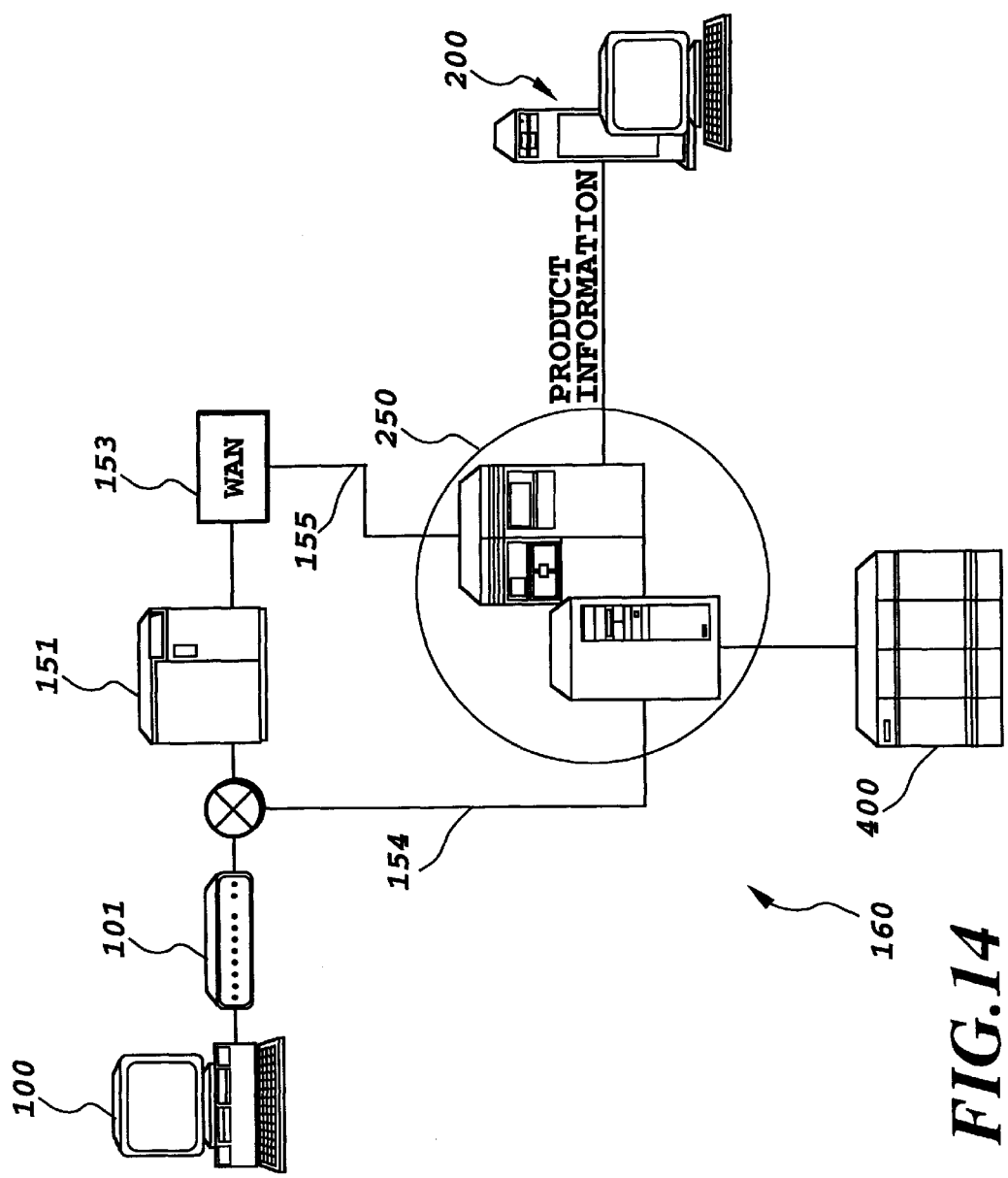
FIG. 14 is a block diagram showing a second embodiment of a marketing system in accordance with the present invention.

The foregoing embodiment 1 handles a case in which the order information from the client is addressed to the terminal equipment 200 of the vendor. FIG. 14 shows a second embodiment of a marketing system in accordance with the present invention, which is suitable for placing orders with a plurality of vendors. In FIG. 14, portions corresponding to those of FIG. 1 are designated by the same reference numerals, and the description thereof is omitted here. In FIG. 14, the reference numeral 250 designates an accepting center for receiving orders exclusively. The accepting center 250 comprises two communications systems. A first system is connected to the Internet (WAN) 153, and provides home pages of a number of vendors. A second system receives order information from the terminals 100 of clients through the public phone network 154. The accepting center 250 stores the received order information in a storage not shown in FIG. 14, and transmits it to the terminal 200 of a vendor and a terminal 400 of a credit company. Thus, the order information is managed in the accepting center 250 in this example.

It is possible to modify the foregoing embodiments as follows:

1) The communications equipment 152 of the service provider can provide a home page including product information of a number of vendors on one page.

2) As communication systems providing home pages (called a server), not only commercial service providers, but also general purpose computers or work stations can be used which are connected with the Internet through a gateway or a router, and these systems can be installed in a shop.

3) The order information to be transmitted from the client to the order accepting system can be encrypted, and decrypted at the receiving side.

4) The order manager 121 can be not only retrieved from the server of the home page as in the foregoing embodiment, but also installed in the terminal equipment 100 of the client from a recording medium such as a floppy disk, a compact disk or a memory card.

5) Although it is only one terminal to which the order information is transmitted through the public phone network 154 in the forgoing embodiments, it can be transmitted to a plurality of terminals. There are two cases with this. The first is a case where a plurality of shops are under the same manager. In this case, the phone numbers of the terminals 200 of the shops are listed in the order manager 121 or in a related file. The CPU 107 of the terminal equipment 100 picks up the toll number of the phone number of the client input for placing an order, and selects the phone number of the terminal equipment 200 whose toll number agrees with that of the client, thereby transmitting the order information to that terminal equipment 200. If no toll number agrees, a particular phone number is used which is predetermined in the list.

The second is a case where a plurality of servers provide the Internet (WAN) 153 with different home pages. In this case, each terminal equipment 100 is provided with a list relating the phone numbers of terminals 200 of vendors with the names of products or with the URLs of the home pages. When the client selects a product, the CPU 107 searches the list for the phone number corresponding to the product or to the URL on the retrieved home page, and transmits the order information using the phone number.

6) Although the foregoing embodiment employs the buttons 305 and 307 in FIG. 11 to achieve the order, these buttons are not essential. For example, it is possible for a document described using HTML to display character strings in different colors, and to start a program when a particular character string among them is pointed with the pointing device 103. Thus, the order manager 121 can be started when a word "order" is pointed with the pointing device 103 instead of the button.

7) Considering that the order information, which is transmitted from the terminal equipment 100 of the client to the terminal equipment 200 of the vendor, includes the ID (identification) number of a credit card, it is possible to encrypt the order information, or to use communication protocol demanding a password when the terminal equipment 100 of the client logs in the terminal equipment 200 of the vendor. In this case, the password can be embedded in the center manager 222 or order manager 121, or manually input by the client.

8) Although the foregoing embodiment illustrates a home page of one vendor, it is possible for the terminal equipment 100 of the client to access home pages of a number of vendors.

In this case, URLs (port numbers on the Internet including a communications address) of sites to be accessed are stored in the order manager in the form of a list or added to the order manager in the form of a file. The CPU 107 displays the list when executing the order manager so that the client can select a desired site to be accessed with the pointing device 103. Thus, the CPU 107 can access a different home page using the selected URL. When placing an order, it is enough for the client to input product names of vendors in the order form on the display screen. It is also possible to place an order for each home page, and to provide an order list display mode in which the order information is accumulated to be displayed in its entirety. The order information is sequentially transmitted to the terminals (order accepting systems) of the vendors to which it should be sent.

9) Although the cancellation of the order is carried out while the terminal does not access the service provider in the foregoing embodiment, it can be performed while the terminal accesses the service provider. In this case, the terminal displays a window for the cancellation so that the client inputs information required for the cancellation. Then, the cancellation information is directly transmitted to the terminal of the vendor in response to transmission instructions.

10) It is preferable for the terminal of the vendor (order accepting system), which receives the order information, to transmit an acknowledgment to the terminal of the client through the WAN. This also applies in the case of receiving the cancellation information. When there is no stock or the cancellation of the order is unacceptable, it is preferable to return to the client the information transmitted therefrom, and to send a reply about the dealing thereafter in a form of document.

11) If the vendor wishes to send a message to the client as when shipping the order, the information server can transmits the message prepared beforehand to the terminal of the client when the client accesses the information server.

12) When communicating information between the order accepting system and the communications system of a credit company, it is possible to keep privacy by providing the company with only part of the order information within a credit line.

13) It is possible to configure a system comprising neutral facilities which exclusively accept primary orders, and transmit, to a credit company, data selected from among order requirements such as the client's name, product names, the number of the products ordered, prices, date, credit ID number, vendors, etc., to carry out procedures and keep privacy, thereby obtaining permission to sale.

14) The terminal of the client can comprise a bar code reader to read bar code information constituting product information of a mail order catalog. In addition, reading a particular bar code in the catalog can be used by itself or in conjunction with the home page to automatically start the order manager.

15) A home page delivered by an information server can have a button for inquiring about a product. This enables the terminal of the client to receive more detailed explanation about the product from the information server, when that button is operated by the client even after the order.

16) The public phone network 154 of the foregoing embodiment is also applicable for receiving from the client the cancellation information, inquiry about the product, charge data, or other confidential data.

17) The terminal of the client transmits the order information to the terminal of the vendor through the public phone network 154. The network 154 can be used, at the same time, for transmitting a request to the terminal of the vendor to send charge data or confidential data, and for receiving these data at the terminal of the client.

18) After the terminal of the client has transmitted the order information to the terminal of the vendor through the public phone network 154, the network 154 can be used for transmitting the charge data or confidential data from the terminal of the vendor to the terminal of the client, or for transmitting a request from the terminal of the client to that of the vendor to send necessary data, and for receiving these data at the terminal of the client.

19) The present invention can handle the following information as applications of the product marketing.

(1) The information about filing a patent application or advice on it stored in the information server of a patent firm can be referred to from the terminal of a client. On the other hand, specifications and application documents needed for the filing can be transmitted from the terminal of the client to the terminal of the patent firm. Furthermore, payment can be completed through the terminals.

(2) The information about property or dealings stored in the information server of a real estate information service agent can be referred to from the terminal of a client. On the other hand, information on inquiry or contract for property is transmitted from the terminal of the client to the terminal of the real estate information service agent. In addition, payment can be completed through the communications.

(3) The public information stored in the information server of a public office such as a government office, a prefecture, city, ward, town or village office, a fringe organization, etc. can be referred to from the terminal of a client. On the other hand, the terminal of the client can transmit information to the terminal of the public organization. In addition, payment can be completed through the terminals.

(4) Information indices of games or music information stored in an information server of an information provider of games or music can be referred to from the terminal of a client. Thus, the client requests for desired information from the terminal through a public phone network to obtain the desired data from the information server through the public phone network. In addition, payment can be completed through the terminal.

(5) Information indices which are possessed by a public office or a company and stored in its information server can be referred to from the terminal of a client. Thus, the client requests for desired information from the terminal through a public phone network to obtain the desired data from the information server through the public phone network. In addition, payment can be completed through the terminal.

(6) The present invention is applicable to communications between a security company and a client; to information communications between a hospital and a client; to communications of transaction information between a client and a stock company or a bank; to communications about an insurance transaction between a client and an insurance company; to making reservations for tickets of transport facilities, and for accommodation at inns or hotels; to ordering a subscription to newspapers, magazines, TV programs or the like, or advertisements to an publicity agent; and to a corresponding course system for sending problems from its information server and for receiving their answers from a client by a terminal at the school, which finally involve direct or indirect charges (such as prizes, value-equivalent services) regardless of marketing, information service, membership service.

20) Although the foregoing embodiment employs a wire WAN, the present invention is also applicable to a radio WAN such as satellite broadcasting, TV communications, etc.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A marketing system comprising:
   an information server for providing a WAN (wide area network) with guidance information including product information about selling a product and instructions information about an order;

terminal equipment connectable to said WAN; and order accepting equipment, wherein said terminal equipment including:
- first communications means for acquiring said guidance information from said information server through said WAN;
- display means for displaying said product information and particular information for an order in said guidance information acquired;
- a pointing device for pointing said particular information on an image on said display means;
- input means for inputting order information about an order;
- control means for enabling input of said order information through said input means in response to a pointing of said pointing device; and
- second communications means for transmitting said order information input through said input means to said order accepting equipment through a communications network other than said WAN.

2. The marketing system as claimed in claim 1, wherein said order information includes an identification number of a credit card.

3. The marketing system as claimed in claim 1, wherein said order accepting equipment is installed in a shop of a vendor.

4. The marketing system as claimed in claim 1, wherein said information server provides guidance information about products of a plurality of vendors, and said order accepting equipment receives order information about products from said plurality of vendors.

5. The marketing system as claimed in claim 1, wherein said control means comprises software, and a CPU for enabling input of said order information by executing said software, and wherein said information sever provides said terminal equipment with said software.

6. The marketing system as claimed in claim 5, further comprising decision means for making a decision whether said software is present in said terminal equipment in response to the pointing of said pointing device to said particular information; and command means for commanding transfer of said software when said decision means makes a negative decision, wherein said first communications means acquires said software from said information server in response to a transfer command of said command means.

7. The marketing system as claimed in claim 1, wherein said second communications means disconnects a connection between said information server and said first communications means.

8. The marketing system as claimed in claim 1, wherein said terminal equipment further comprising storing means for cumulatively storing order information transmitted to said order accepting equipment, and display control means for controlling said display means to display said order information stored in said storing means.

9. The marketing system as claimed in claim 8, further comprising selecting means for selecting particular order information from among the order information displayed on said display means under control of said display control means, cancellation command means for commanding cancellation of an order, and cancellation information generating means for generating, in response to a command of said cancellation command means, cancellation information for canceling an order including said particular order information selected by said selecting means, wherein said first communications means transmits said cancellation information to said information server.

10. An information communications method in a marketing system comprising the steps of:
- connecting an information server with a WAN (wide area network), said information server providing guidance information including product information about selling a product and instructions information about an order;
- connecting terminal equipment to said WAN;
- acquiring said guidance information from said information server through said WAN, and displaying on a display of said terminal equipment said product information and particular information for an order in said guidance information acquired;
- pointing, with a pointing device, said particular information on the display of said terminal equipment;
- enabling input of order information about an order of a product in response to a pointing of said pointing device;
- transmitting said order information from said terminal equipment through a communications network other than said WAN; and
- receiving said order information by order accepting equipment through said communications network other than said WAN.

11. The information communications method in the marketing system as claimed in claim 10, wherein said order information includes an identification number of a credit card.

12. The information communications method in the marketing system as claimed in claim 10, wherein said order accepting equipment is installed in a shop of a vendor.

13. The information communications method in the marketing system as claimed in claim 10, wherein said information server provides guidance information about products of a plurality of vendors, and said order accepting equipment receives order information about products of said plurality of vendors.

14. The information communications method in the marketing system as claimed in claim 10, wherein said terminal equipment comprises a storing medium for storing software, and a CPU for enabling input of said order information by reading and executing said software, and wherein said information sever provides said terminal equipment with said software.

15. The information communications method in the marketing system as claimed in claim 14, further comprising the step of making a decision whether said software is present in said terminal equipment in response to a pointing of said pointing device; commanding transfer of said software when a negative decision is made, and acquiring said software from said information server in response to a transfer command.

16. The information communications method in the marketing system as claimed in claim 10, further comprising the step of disconnecting a connection between said information server and said terminal equipment when carrying out communications between said terminal equipment and said order accepting equipment.

17. The information communications method in the marketing system as claimed in claim 10, further comprising the steps of cumulatively storing, by said terminal equipment, order information transmitted to said order accepting equipment, and enabling said order information stored to be displayed on said display.

18. The information communications method in the marketing system as claimed in claim 10, further comprising the steps of selecting particular order information from among the order information displayed on said display; commanding cancellation of an order; generating, in response to a command of cancellation, cancellation information for canceling an order including said particular order information selected; and transmitting said cancellation information from said terminal equipment to said information server.

19. A recording medium having program code means readable by a CPU in terminal equipment of a system in which said terminal equipment is connected with an information server through a WAN (wide area network) so that product information is sent from said information server to said terminal equipment, said recording medium comprising:

program code means started when said product information and particular information for an order is displayed on a display of said terminal equipment;

wherein said program code means comprising:
program code means for accepting order information input in said terminal equipment; and
program code means for transmitting said order information from said terminal equipment to order accepting equipment through a communications network other than said WAN.

20. The recording medium as claimed in claim 19, wherein said program code means readable by said CPU further includes program code means for disconnecting connection between said terminal equipment and said information server while communications is carried out between said terminal equipment and said order accepting equipment.

21. The marketing system as claimed in claim 1, wherein said second communications means disconnects a connection between said information server and said first communication means while maintaining a connection between said terminal equipment and said order accepting equipment through a communications network other than said WAN.

22. The information communications method in the marketing system as claimed in claim 10, further comprising the step of disconnecting a connection between said information server and said terminal equipment when carrying out communications between said terminal equipment and said order accepting equipment while maintaining a connection between said terminal equipment and said order accepting equipment through a communications network other than said WAN.

* * * * *